US012583387B2

(12) United States Patent
Chang et al.

(10) Patent No.: US 12,583,387 B2
(45) Date of Patent: Mar. 24, 2026

(54) VEHICLE IMAGE RECOGNITION MODULE

(71) Applicant: Chicony Electronics Co., Ltd., New Taipei (TW)

(72) Inventors: Hsiu-Wen Chang, New Taipei (TW); Yen-Ting Liu, New Taipei (TW); Chih-Liang Liao, New Taipei (TW)

(73) Assignee: Chicony Electronics Co., Ltd., New Taipei City (TW)

( * ) Notice: Subject to any disclaimer, the term of this patent is extended or adjusted under 35 U.S.C. 154(b) by 99 days.

(21) Appl. No.: 18/605,758

(22) Filed: Mar. 14, 2024

(65) Prior Publication Data
US 2024/0351523 A1 Oct. 24, 2024

(30) Foreign Application Priority Data
Apr. 20, 2023 (TW) .................................. 112114704

(51) Int. Cl.
*B60R 1/22* (2022.01)
*B60R 11/04* (2006.01)
*B60R 11/00* (2006.01)

(52) U.S. Cl.
CPC ................ *B60R 1/22* (2022.01); *B60R 11/04* (2013.01); *B60R 2011/004* (2013.01); *B60R 2011/0047* (2013.01)

(58) Field of Classification Search
CPC ..... B60R 1/22; B60R 11/04; B60R 2011/004; B60R 2011/0047
See application file for complete search history.

(56) References Cited

U.S. PATENT DOCUMENTS

| | | | | |
|---|---|---|---|---|
| 2007/0153119 A1* | 7/2007 | Bilbrey | .................. | H04N 7/142 |
| | | | | 348/E5.042 |
| 2023/0173995 A1* | 6/2023 | Avila | ...................... | B60R 11/04 |
| | | | | 248/206.5 |
| 2025/0222857 A1* | 7/2025 | Rodriguez Barros | . | B60Q 1/525 |

FOREIGN PATENT DOCUMENTS

| | | | | | |
|---|---|---|---|---|---|
| CN | 203574761 | | 4/2014 | | |
| CN | 113895400 | | 1/2022 | | |
| DE | 60301640 | T2 * | 6/2006 | .............. | B60R 1/12 |
| EP | 3790767 | B1 * | 6/2025 | ........... | H04N 23/957 |
| JP | 2019077366 | | 5/2019 | | |
| JP | 2020514159 | | 5/2020 | | |
| KR | 20030019546 | A * | 3/2003 | ............. | G08G 1/166 |
| TW | 202009293 | | 3/2020 | | |

OTHER PUBLICATIONS

"Office Action of Japan Counterpart Application", issued on Apr. 16, 2025, p. 1-p. 3.

* cited by examiner

*Primary Examiner* — Brian A Zimmerman
*Assistant Examiner* — Anthony D Afrifa-Kyei
(74) *Attorney, Agent, or Firm* — JCIPRNET

(57) ABSTRACT
A vehicle image recognition module includes an appearance member, an assembly member, an image capturing unit, and a color change assembly. The assembly member is disposed on an inside of the appearance member. The image capturing unit is disposed on the assembly member, and the appearance member is located on a front side of the image capturing unit. The color change assembly is disposed on the front side of the image capturing unit. The color change assembly is adapted to be switched between transparence and a opaque color.

14 Claims, 6 Drawing Sheets

VEHICLE IMAGE RECOGNITION MODULE

CROSS-REFERENCE TO RELATED APPLICATION

This application claims the priority benefit of Taiwan application serial no. 112114704, filed on Apr. 20, 2023. The entirety of the above-mentioned patent application is hereby incorporated by reference herein and made a part of this specification.

BACKGROUND

Technical Field

The disclosure relates to an image recognition module, and particularly relates to a vehicle image recognition module.

Description of Related Art

Currently, the design of a vehicle's face recognition mode or a sentry mode (that is, detecting persons or objects approaching the vehicle and taking appropriate safety measures) often requires an image capturing device (such as a camera) to be disposed on the inside of one of the vehicle's pillars and has a corresponding light-transmitting region formed on the surface of the pillar so that the image capturing device can capture images outside the pillar. However, such design results in an inconsistency in the color of the pillar, making it less cosmetically appealing, and easily exposing the image capture device, which weakens the vehicle's theft prevention and security.

SUMMARY

The disclosure provides a vehicle image recognition module having nice physical appearance and concealment.

The vehicle image recognition module of the disclosure includes an appearance member, an assembly member, an image-capturing unit, and a color-changing assembly. The assembly member is disposed on an inside of the appearance member. The image-capturing unit is disposed on the assembly member. The appearance member is located on a front side of the image-capturing unit. The color-changing assembly is disposed on the front side of the image-capturing unit. The color-changing assembly is adapted to be switched between transparence and an opaque color.

In an embodiment of the disclosure, the assembly member is a housing and has a first accommodation space and a second accommodation space in communication with each other. The second accommodation space is located between the first accommodation space and the appearance member. The image-capturing unit is disposed in the first accommodation space. The color-changing assembly is disposed in the second accommodation space and is located between the appearance member and the image-capturing unit.

In an embodiment of the disclosure, a front end of the first accommodation space communicates with the second accommodation space. The assembly member has a connecting surface in the second accommodation space. The front end of the first accommodation space is surrounded by the connecting surface. The color-changing assembly is joined to the connecting surface.

In an embodiment of the disclosure, the assembly member is a bracket and is disposed on the appearance member, and a back end of the image-capturing unit is disposed on the assembly member.

In an embodiment of the disclosure, the vehicle image recognition module further includes a cover body. The cover body is disposed on the appearance member and has an opening. The color-changing assembly is embedded in the appearance member. A portion of the image-capturing unit extends into the opening and is aligned with the color-changing assembly.

In an embodiment of the disclosure, the color-changing assembly is fixed on the cover body.

In an embodiment of the disclosure, the vehicle image recognition module further includes a sealing member. The sealing member is disposed between the appearance member and the cover body.

In an embodiment of the disclosure, the opaque color is identical to a color of the appearance member.

In an embodiment of the disclosure, the appearance member includes an opaque region and a light-transmitting region. The opaque region is adjacent to the light-transmitting region, and the light-transmitting region is aligned with the color-changing assembly and the image-capturing unit.

In an embodiment of the disclosure, the opaque color is identical to a color of the opaque region.

In an embodiment of the disclosure, the color-changing assembly includes an electrochromic glass.

In an embodiment of the disclosure, the color-changing assembly includes a transparent light guide plate and a light source. The light source is adjacent to the transparent light guide plate and is adapted to emit a colored light whose color is identical to the opaque color to the transparent light guide plate.

In an embodiment of the disclosure, the light source is adapted to emit an invisible light to the transparent light guide plate.

In an embodiment of the disclosure, the vehicle image recognition module further includes a light-sensing member. The light-sensing member is disposed on the assembly member and is adapted to sense light intensity outside the appearance member.

In an embodiment of the disclosure, when a distance between an object outside the appearance member and the appearance member is less than a preset value, the color-changing assembly is switched to be transparent.

In an embodiment of the disclosure, the appearance member is an appearance panel of a pillar, a side mirror, a front or rear side panel, a door, a tailgate, a trunk, an exterior ornamental panel, a front hood, or a portion of a front or rear bumper, of a vehicle.

In an embodiment of the disclosure, the vehicle image recognition module further includes a sealing member. The sealing member is disposed between the appearance member and the assembly member.

In an embodiment of the disclosure, the color-changing assembly is joined to the assembly member.

In an embodiment of the disclosure, the color-changing assembly is engaged with the assembly member.

Based on the above, the color-changing assembly is disposed on the front side of the image-capturing unit in the vehicle image recognition module of the disclosure. When it is required to capture an image from outside the appearance member, the color-changing assembly may be switched to be transparent so that the image-capturing unit is able to successfully capture the image. In addition, the color-changing assembly may be switched to an opaque color when there is no need to capture an image from outside the appearance member, and since the opaque color is identical to the color of the appearance member (for example, a vehicle's body or ornamental panel), the design provides the vehicle image recognition module with excellent conceal-
ment and consistency in color with the appearance member.

DESCRIPTION OF THE EMBODIMENTS

Figure 1:
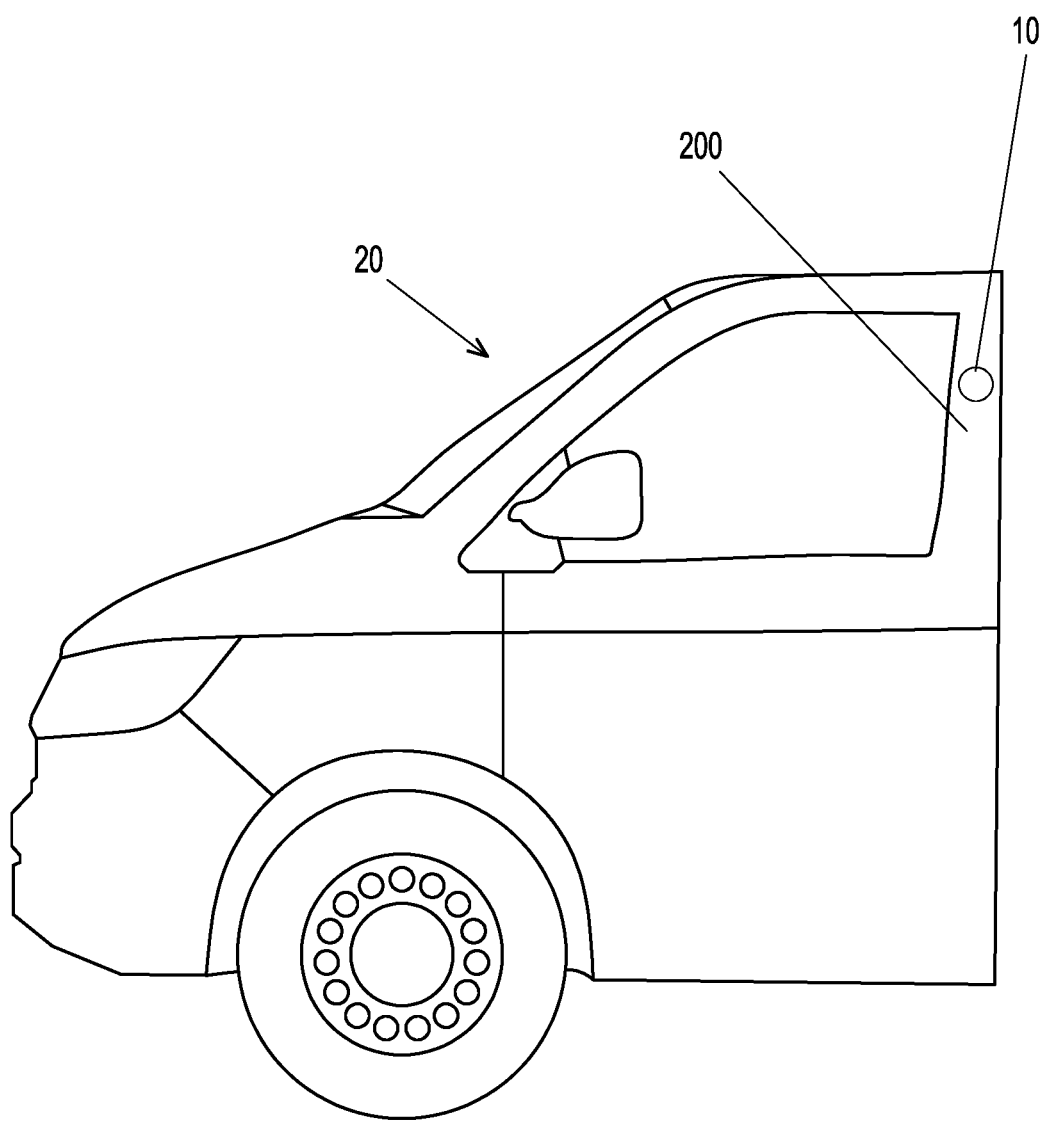
FIG. 1 is a schematic diagram of a vehicle image recog-
nition module disposed on a vehicle according to an embodi-
ment of the disclosure.

FIG. 1 is a schematic diagram of a vehicle image recog-
nition module disposed on a vehicle according to an embodi-
ment of the disclosure. Referring to FIG. 1, a vehicle image
recognition module 10 in this embodiment is, for example,
disposed at a center pillar 200 (commonly known as the B
pillar) of a vehicle 20, but in another embodiment, the
vehicle image recognition module 10 may also be disposed
at one of the other pillars or any position of the vehicle body
(e.g., a side mirror, a front or rear side panel, a door, a
tailgate, a trunk, an exterior ornamental panel, a front hood,
or a portion of a front bumper or a rear bumper) of the
vehicle 20, and the disclosure is not limited thereto. The
vehicle image recognition module 10 is provided with image
capturing and recognition functions. It may be used, for
example, in a sentry mode to detect humans or objects
approaching the vehicle 20 so that appropriate security
measures may be taken.

Figure 2:
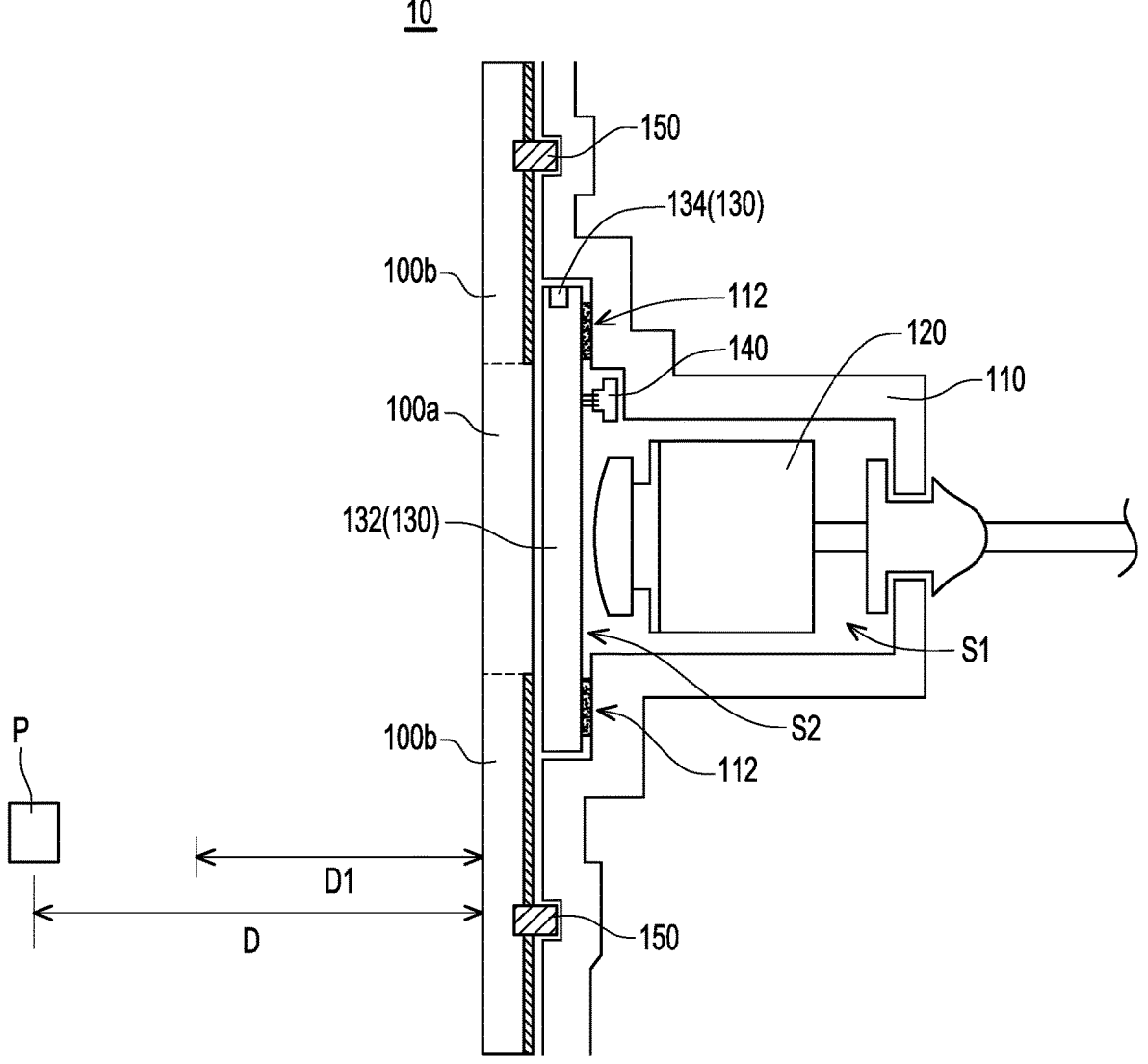
FIG. 2 is a schematic diagram of the vehicle image
recognition module of FIG. 1.

FIG. 2 is a schematic diagram of the vehicle image
recognition module of FIG. 1. Referring to FIG. 2, the
vehicle image recognition module 10 in the embodiment
includes an appearance member 100, an assembly member
110, an image-capturing unit 120, and a color-changing
assembly 130. The assembly member 110 is disposed on an
inside of the appearance member 100. The assembly mem-
ber 110 may include, for example, a plastic part, a sheet
metal part, a cast part, or a composite material (such as
carbon fiber), but the material of the assembly member 110
is not limited thereto. The image-capturing unit 120 is, for
example, a camera and is disposed on the assembly member
110. The appearance member 100 is located on a front side
of the image-capturing unit 120. The color-changing assem-
bly 130 is disposed on the front side of the image-capturing
unit 120 and is adapted to be switched between transparence
and an opaque color.

When the vehicle image recognition module 10 needs to
capture an image from outside the appearance member 100,
the color-changing assembly 130 may be switched to be
transparent, so that the image-capturing unit 120 can suc-
cessfully capture the image. When the vehicle image rec-
ognition module 10 need not capture an image from outside
the appearance member 100, the color-changing assembly
130 is switched to an opaque color, which provides the vehicle image recognition module 10 with excellent con-
cealment and nice appearance. The details of the design will
be further illustrated below.

Specifically, the appearance member 100 in this embodi-
ment is, for example, the appearance panel of the center
pillar 200 (FIG. 1) of the vehicle 20, and its material is, for
example, glass, sheet metal, or acrylic. The appearance
member 100 includes a light-transmitting region 100a and
an opaque region 100b. The opaque region 100b is adjacent
to the light-transmitting region 100a. The light-transmitting
region 100a is aligned with the color-changing assembly
130 and the image-capturing unit 120.

In the embodiment, the assembly member 110 is a hous-
ing and has a first accommodation space S1 and a second
accommodation space S2 in communication with each other,
and the second accommodation space S2 is located between
the first accommodation space S1 and the appearance mem-
ber 100. The image-capturing unit 120 is disposed in the first
accommodation space S1. The color-changing assembly is
disposed in the second accommodation space S2 and is
located between the appearance member 100 and the image-
capturing unit 120.

Further, the material of the assembly member 110 is, for
example, ASA (acrylonitrile styrene acrylate) resin, PE
(polyethylene) resin, or ABS (acrylonitrile-Butadiene-Sty-
rene) resin. A front end of the first accommodation space S1
of the assembly member 110 communicates with the second
accommodation space S2. The assembly member 110 has a
connecting surface 112 in the second accommodation space
S2. The front end of the first accommodation space S1 is
surrounded by the connecting surface 112. The color-chang-
ing assembly 130 is joined to the connecting surface 112 and
is adhered to the assembly member 110. The color-changing
assembly 130 may also be joined to the assembly member
110 in the form of adhesion, buckling, or screwing, and the
type of joining is not limited thereto.

Furthermore, the color-changing assembly 130 includes a
transparent light guide plate 132 and a light source 134, and
the light source 134 is adjacent to the transparent light guide
plate 132. The light source 134 in FIG. 2 is schematically
shown on the upper side of the transparent light guide plate
132, but the light source 134 may also be disposed on the
lower side, the front side, or the rear side of the transparent
light guide plate 132. The position of the light source 134 is
not limited thereto.

When there is no need to capture an image from outside
the appearance member 100, the light source 134 is adapted
to emit a light of an opaque color to the transparent light
guide plate 132, so that the transparent light guide plate 132
is shown in the opaque color, and the opaque color is
identical to the color of the opaque region 100b of the
appearance member 100. Meanwhile, since the light-trans-
mitting region 100a of the appearance member 100 is
aligned with the color-changing assembly 130, the light-
transmitting region 100a will also be shown in this opaque
color, so that both the light-transmitting region 100a and the
opaque region 100b of the appearance member 100 are
presented in the same color.

Taking the color of the opaque region 100b of the appear-
ance member 100 is white as an example, when the vehicle
image recognition module 10 need not capture images, the
color-changing assembly 130 may be turned into white to
allow the light-transmitting region 100a of the appearance
member 100 to also be shown as white, allowing the overall
color of the appearance member 100 to be consistent and
cosmetically appealing. Meanwhile, since the appearance
member 100 is visually consistent in color, the position of the image-capturing unit 120 is not easily exposed, thereby providing great concealment and reducing the possibility for the image-capturing unit 120 to be discovered and deliberately obscured or destroyed.

Furthermore, when the light source 134 is activated and continues to emit a colored light, the temperature of the transparent light guide plate 132 will rise, allowing the first accommodation space S1 and the second accommodation space S2 to be maintained at a certain temperature. In this way, the surface of the image-capturing unit 120 may be maintained at an appropriate temperature, thereby achieving the effect of defogging and frost prevention.

When the vehicle image recognition module 10 needs to capture an image from outside the appearance member 100, the light source 134 of the color-changing assembly 130 is turned off, the transparent light guide plate 132 returns to be transparent, so that the image-capturing unit 120 can successfully capture the image from outside the appearance member 100 through the transparent light guide plate 132 and the light-transmitting region 100a of the appearance member 100. In other words, the vehicle image recognition module 10 is provided with concealing and aesthetical effects through the combination of the color-changing assembly 130 and the appearance member 100, and ensures good functionality for image capturing.

In addition, the vehicle image recognition module 10 in the embodiment further includes a light-sensing member 140. The light-sensing member 140 is disposed on the assembly member 110 and is adapted to sense the light intensity outside the appearance member 100, so as to determine whether the ambient light is sufficient. When the vehicle image recognition module 10 needs to capture an image from outside the appearance member 100, if the light-sensing member 140 senses too low light intensity outside the appearance member 100, the light source 134 may emit an invisible light (for example, a light with a wavelength of 940 nm) to the transparent light guide plate 132 for light filling, thereby improving the image quality captured by the image-capturing unit 120. In another embodiment, the vehicle image recognition module 10 may include multiple light sources 134, so as to achieve the above-mentioned light filling.

In addition, the vehicle image recognition module 10 in the embodiment further includes a sealing member 150. The sealing member 150 is, for example, an O-ring or an adhesive, and is disposed between the appearance member 100 and the assembly member 110 to prevent foreign matter or moisture from entering the second accommodation space S2 and the first accommodation space S1 and affecting the operation of components therein.

Figure 3:
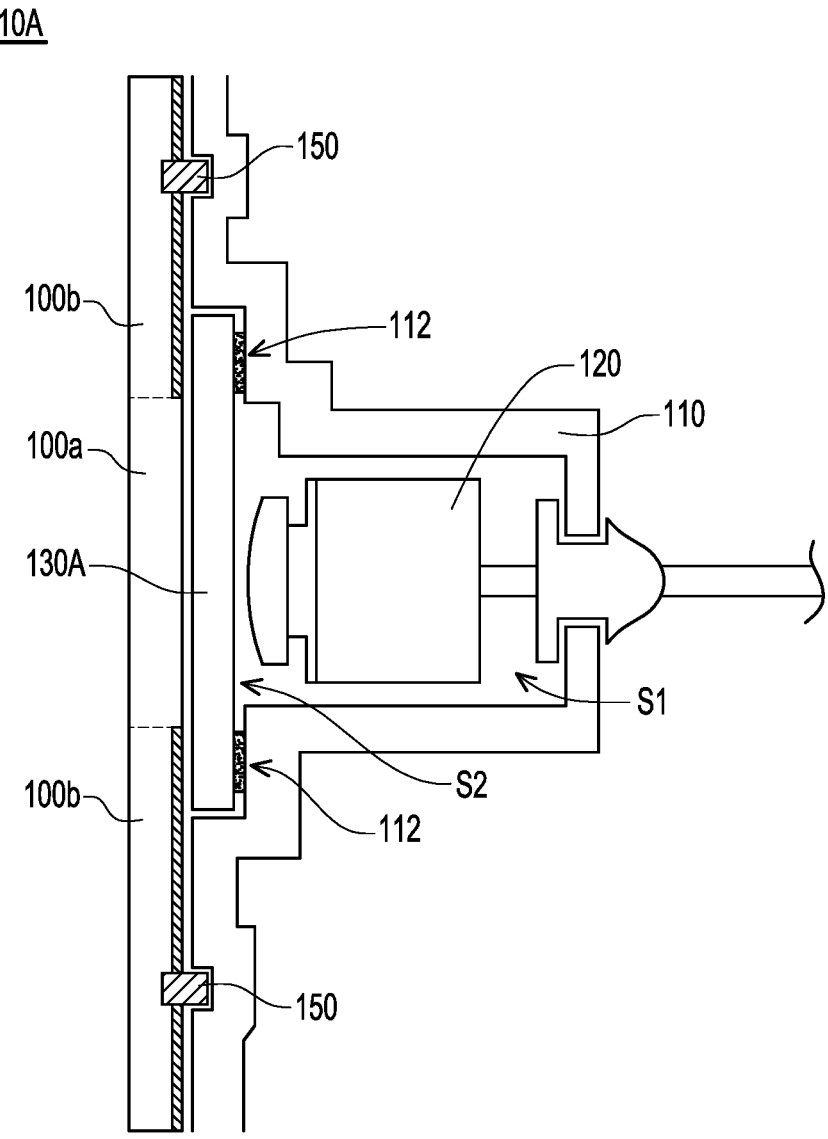
FIG. 3 is a schematic diagram of a vehicle image recog-
nition module according to another embodiment of the
disclosure.

FIG. 3 is a schematic diagram of a vehicle image recognition module according to another embodiment of the disclosure. A difference between the embodiment shown in FIG. 3 and the embodiment shown in FIG. 2 is that the color-changing assembly 130A of the vehicle image recognition module 10A is an electrochromic glass in FIG. 3. Specifically, when there is no need to capture an image from outside the appearance member 100, the color-changing assembly 130A is powered on and may be switched to an opaque color. The opaque color is identical to the color of the opaque region 100b of the appearance member 100.

Since the light-transmitting region 100a of the appearance member 100 is aligned with the color-changing assembly 130A, the light-transmitting region 100a will also be shown in this opaque color, so that both the light-transmitting region 100a and the opaque region 100b of the appearance member 100 are presented in the same color, allowing the overall color of the appearance member 100 to be consistent and cosmetically appealing. Meanwhile, since the appearance member 100 is consistent in color, the position of the image-capturing unit 120 is not easily exposed, thereby providing great concealment and reducing the possibility for the image-capturing unit 120 to be discovered and deliberately obscured or destroyed.

When it is required to capture an image from outside the appearance member 100, the color-changing assembly 130A is deactivated and returns to be transparent, so that the image-capturing unit 120 can capture the image from outside the appearance member 100 through the color-changing assembly 130A and the light-transmitting region 100a of the appearance member 100. In other words, the vehicle image recognition module 10A is provided with concealing and aesthetical effects through the combination of the color-changing assembly 130A and the appearance member 100, and ensures good functionality for image capturing.

Figure 4:
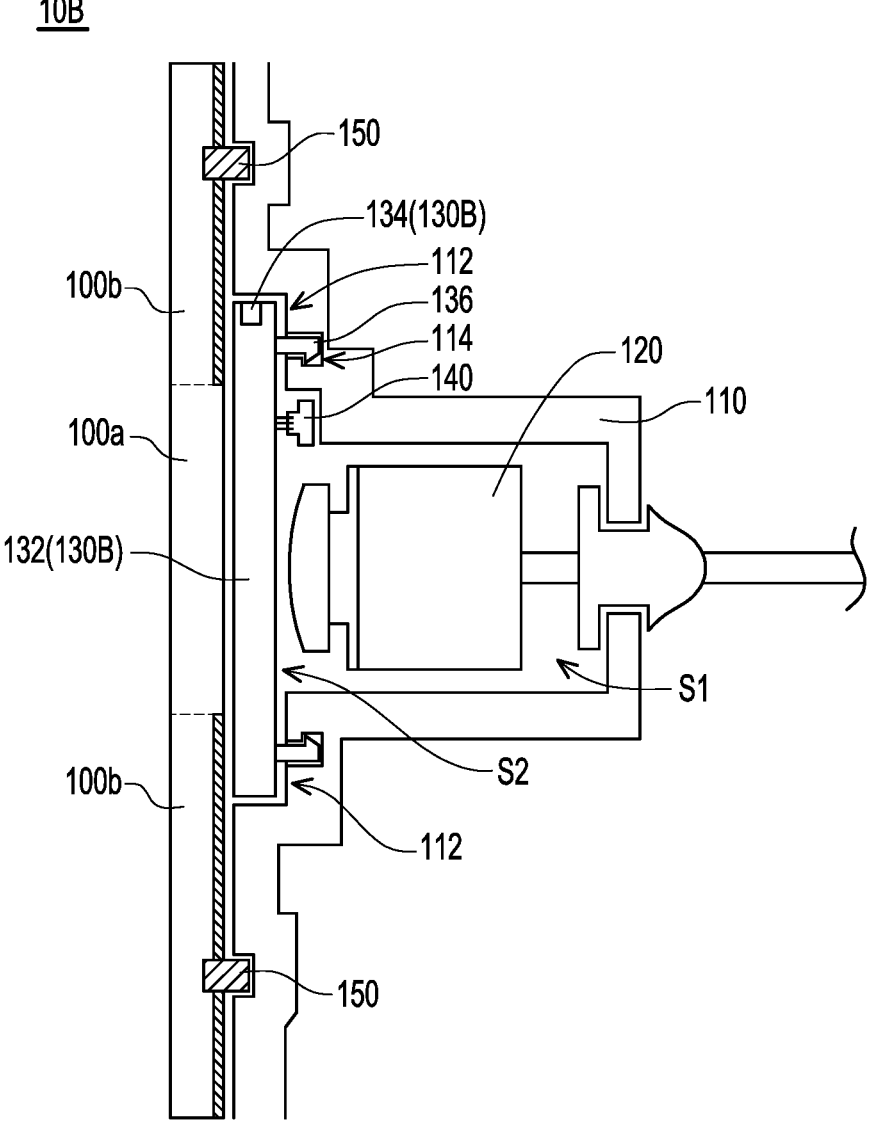
FIG. 4 is a schematic diagram of a vehicle image recog-
nition module according to another embodiment of the
disclosure.

FIG. 4 is a schematic diagram of a vehicle image recognition module according to another embodiment of the disclosure. A difference between the embodiment shown in FIG. 4 and the embodiment shown in FIG. 2 is that the color-changing assembly 130B of the vehicle image recognition module 10B is engaged with the assembly member 110 in FIG. 4. Specifically, the color-changing assembly 130B further includes at least one engaging portion 136, the assembly member further includes at least one engaging groove 114, and the engaging groove 114 is located on the connecting surface 112. The color-changing assembly 130B is engaged with the engaging groove 114 through the engaging portion 136, so as to be securely fixed to the assembly member 110.

Figure 5:
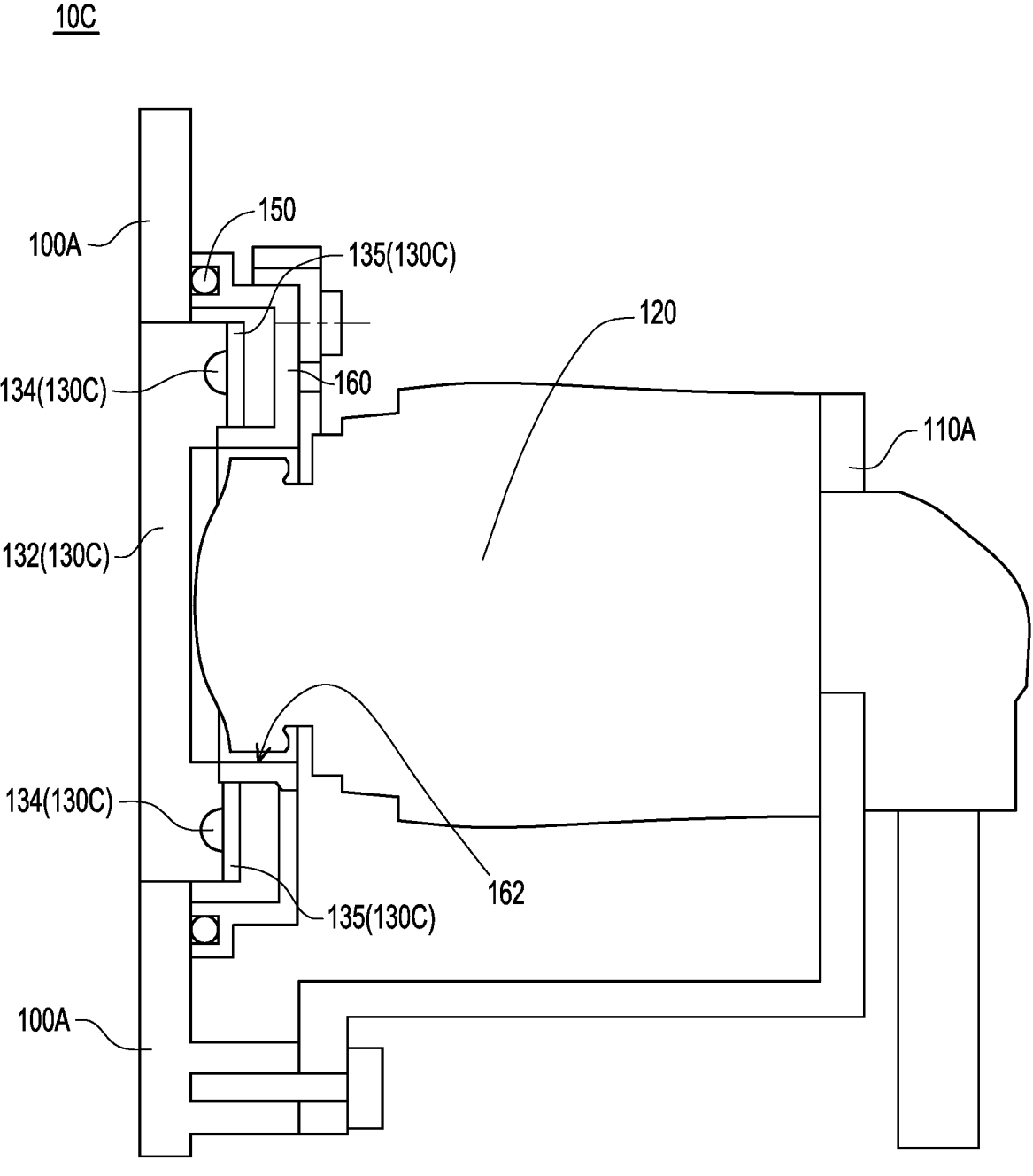
FIG. 5 is a schematic diagram of a vehicle image recog-
nition module according to another embodiment of the
disclosure.

FIG. 5 is a schematic diagram of a vehicle image recognition module according to another embodiment of the disclosure. A difference between the embodiment shown in FIG. 5 and the embodiment shown in FIG. 2 is that the assembly member 110A of the vehicle image recognition module 10C is a bracket, and the color-changing assembly 130C is embedded in the appearance member 100A in FIG. 5. In detail, the vehicle image recognition module 10C includes a cover body 160, which is disposed on the appearance member 100A and has an opening 162. The assembly member 110A is disposed on the appearance member 100A, the image-capturing unit 120 is disposed on the assembly member 110A, and a portion of the image-capturing unit 120 extends into the opening 162 and is aligned with the color-changing assembly 130C.

Moreover, the color-changing assembly 130C is embedded in the appearance member 100A and fixed on the cover body 160. That is, the color-changing assembly 130C is not located between the appearance member 100A and the image-capturing unit 120, thereby saving space and making the fixation and fabrication easier.

Similar to the embodiment shown in FIG. 2, the color-changing assembly 130C includes a transparent light guide plate 132, a light source 134, and further a circuit board 135, and the light source 134 is disposed on the circuit board 135. When there is no need to capture an image from outside the appearance member 100A, the light source 134 provided in the color-changing assembly 130C emits a light of an opaque color to the transparent light guide plate 132, so that the transparent light guide plate 132 is shown in the opaque color, and the color of the color-changing assembly 130C is identical to the color of the appearance member 100A, providing great concealment and aesthetic effects. When it is required to capture an image from outside the appearance member 100A, the light source 134 is turned off, and the transparent light guide plate 132 returns to be transparent, so that the image-capturing unit 120 can successfully capture the image from outside the appearance member 100A through the transparent light guide plate 132.

In addition, the sealing member 150 in the embodiment is disposed between the appearance member 100A and the cover body 160. Preferably, the sealing member 150 is an O-ring or a glue that prevents foreign matter or moisture from entering the cover body 160 and affecting the operation of components therein.

Figure 6:
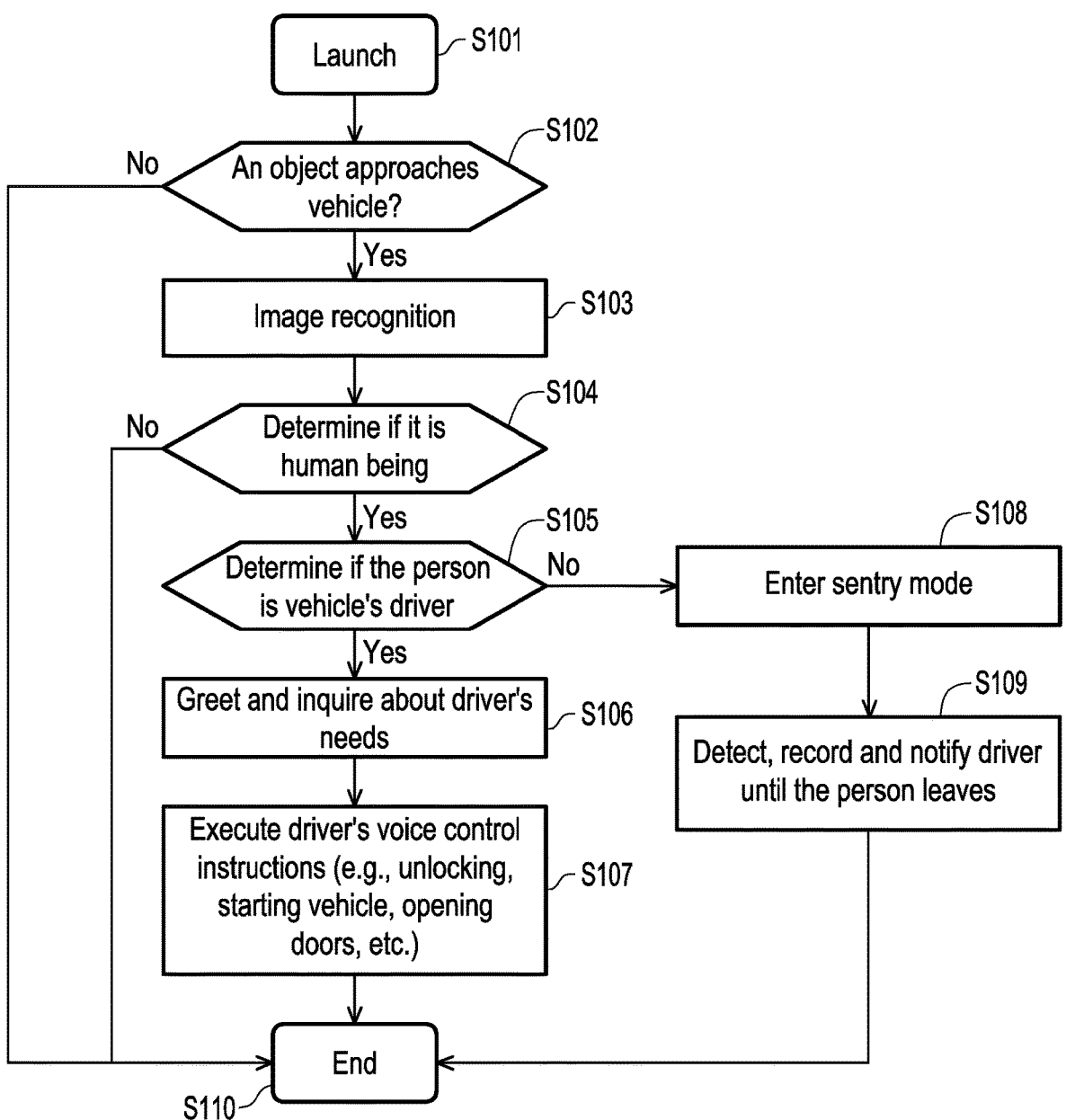
FIG. 6 is a flow chart for the operation of a vehicle image
recognition module according to an embodiment of the
disclosure.

FIG. 6 is a flow chart for the operation of a vehicle image recognition module according to an embodiment of the disclosure. Referring to FIG. 2 and FIG. 6, a sentry mode will be used as an example to illustrate the application of the vehicle image recognition module 10 in theft-prevention security.

First, the vehicle image recognition module 10 starts as step S101 and proceeds to step S102. In step S102, a vehicle radar of the vehicle 20 (FIG. 1) detects whether there is an object P approaching the vehicle 20. If there is no object P approaching the vehicle 20, step S110 is executed to end the operation of the vehicle image recognition module 10. On the contrary, when the distance D between the object P (FIG. 2) detected outside the appearance member 100 and the appearance member 100 is less than a preset distance D1, proceed to step S103. Meanwhile, the color of the color-changing assembly 130 is switched to be transparent, and the image-capturing unit 120 may capture an image of the object P through the transparent light guide plate 132 and the light-transmitting region 100*a* of the appearance member 100.

Next, proceed to step S104. The image captured by the image-capturing unit 120 may be processed for image recognition through a processing unit to determine whether the object P is a human being. If it is determined that the object P is not a human being, step S110 is executed to end the operation of the vehicle image recognition module 10. If it is determined that the object P is a human being, step S105 is executed to further determine whether the person is the driver of the vehicle 20. If the person is the driver of the vehicle 20, execute step S106 to greet the driver and inquire about the driver's needs. At that moment, the driver may provide voice control instructions such as unlocking, starting the vehicle 20, or opening a door of the vehicle 20 to meet the driver's needs (i.e., step S107). After completion, step S110 is executed to end the operation of the vehicle image recognition module 10.

It is worth noting that in step S105, if the approaching person is determined not to be the driver, step 108, which is the sentry mode, will be executed. As shown in step 109, the sentry mode can detect and record the person's activities, upload the recorded video to cloud services, and notify the driver until the person moves away from the vehicle 20, so as to achieve monitoring and recording of the suspicious person.

In summary, the color-changing assembly is disposed on the front side of the image-capturing unit in the vehicle image recognition module of the disclosure. When it is required to capture an image from outside the appearance member, the color-changing assembly may be switched to be transparent so that the image-capturing unit is able to successfully capture the image. In addition, the color-changing assembly may be switched to an opaque color when there is no need to capture an image from outside the appearance member, and since the opaque color is identical to the color of the appearance member, the design provides the vehicle image recognition module with excellent concealment and consistency in color with the appearance member.

What is claimed is:

1. A vehicle image recognition module, comprising:
an appearance member;
an assembly member, disposed on an inside of the appearance member;
an image-capturing unit, disposed on the assembly member, wherein the appearance member is located on a front side of the image-capturing unit; and
a color-changing assembly is disposed on the front side of the image-capturing unit, wherein the color-changing assembly is adapted to be switched between transparence and an opaque color,
wherein the assembly member is a housing and has a first accommodation space and a second accommodation space in communication with each other, the second accommodation space is located between the first accommodation space and the appearance member, the image-capturing unit is disposed in the first accommodation space, the color-changing assembly is disposed in the second accommodation space and is located between the appearance member and the image-capturing unit.

2. The vehicle image recognition module according to claim 1, wherein a front end of the first accommodation space communicates with the second accommodation space, the assembly member has a connecting surface in the second accommodation space, the front end of the first accommodation space is surrounded by the connecting surface, and the color-changing assembly is joined to the connecting surface.

3. The vehicle image recognition module according to claim 1, wherein the opaque color is identical to a color of the appearance member.

4. The vehicle image recognition module according to claim 1, wherein the appearance member comprises an opaque region and a light-transmitting region, the opaque region is adjacent to the light-transmitting region, and the light-transmitting region is aligned with the color-changing assembly and the image-capturing unit.

5. The vehicle image recognition module according to claim 4, wherein the opaque color is identical to a color of the opaque region.

6. The vehicle image recognition module according to claim 1, wherein the color-changing assembly comprises an electrochromic glass.

7. The vehicle image recognition module according to claim 1, wherein the color-changing assembly comprises a transparent light guide plate and a light source, the light source is adjacent to the transparent light guide plate and is adapted to emit a colored light whose color is identical to the opaque color to the transparent light guide plate.

8. The vehicle image recognition module according to claim 7, wherein the light source is adapted to emit an invisible light to the transparent light guide plate.

9. The vehicle image recognition module according to claim 1, further comprising a light-sensing member, wherein the light-sensing member is disposed on the assembly member and is adapted to sense light intensity outside the appearance member.

10. The vehicle image recognition module according to claim 1, wherein when a distance between an object outside the appearance member and the appearance member is less than a preset value, the color-changing assembly is switched to be transparent.

11. The vehicle image recognition module according to claim 1, wherein the appearance member is an appearance panel of a pillar, a side mirror, a front or rear side panel, a door, a tailgate, a trunk, an exterior ornamental panel, a front hood, or a portion of a front or rear bumper, of a vehicle.

12. The vehicle image recognition module according to claim 1, further comprising a sealing member, wherein the sealing member is disposed between the appearance member and the assembly member.

13. The vehicle image recognition module according to claim 1, wherein the color-changing assembly is joined to the assembly member.

14. The vehicle image recognition module according to claim 1, wherein the color-changing assembly is engaged with the assembly member.

\*　\*　\*　\*　\*